United States Patent
Von Novak et al.

(10) Patent No.: US 10,057,604 B2
(45) Date of Patent: Aug. 21, 2018

(54) CLOUD BASED VISION ASSOCIATED WITH A REGION OF INTEREST BASED ON A RECEIVED REAL-TIME VIDEO FEED ASSOCIATED WITH THE REGION OF INTEREST

(71) Applicant: QUALCOMM Incorporated, San Diego, CA (US)

(72) Inventors: William Henry Von Novak, San Diego, CA (US); Mark Caskey, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/200,684

(22) Filed: Jul. 1, 2016

(65) Prior Publication Data

US 2018/0007393 A1    Jan. 4, 2018

(51) Int. Cl.
| | |
|---|---|
| H04N 7/173 | (2011.01) |
| H04N 7/18 | (2006.01) |
| H04N 21/2187 | (2011.01) |
| H04N 21/44 | (2011.01) |
| H04N 21/854 | (2011.01) |
| H04N 21/643 | (2011.01) |

(52) U.S. Cl.
CPC ......... *H04N 21/2187* (2013.01); *H04N 21/44* (2013.01); *H04N 21/44008* (2013.01); *H04N 21/64322* (2013.01); *H04N 21/85406* (2013.01)

(58) Field of Classification Search
None
See application file for complete search history.

(56) References Cited

U.S. PATENT DOCUMENTS

| | | | |
|---|---|---|---|
| 7,683,937 B1 * | 3/2010 | Blumenfeld | H04N 5/23203 348/211.11 |
| 8,723,952 B1 * | 5/2014 | Rozenboim | H04N 7/181 348/143 |
| 2009/0231432 A1 | 9/2009 | Grigsy et al. | |

(Continued)

FOREIGN PATENT DOCUMENTS

| | | |
|---|---|---|
| CN | 203722736 U | 7/2014 |
| EP | 2611110 A1 | 7/2013 |

(Continued)

OTHER PUBLICATIONS

International Search Report and Written Opinion—PCT/US2017/032162—ISA/EPO—dated Jul. 18, 2017.

*Primary Examiner* — James R Marandi
(74) *Attorney, Agent, or Firm* — Toler Law Group, PC (57) ABSTRACT

A method for receiving a real-time video feed of a region of interest includes generating, at a processor of a first device, a request for a real-time video stream of the region of interest. The request indicates a location of the region of interest. The method also includes transmitting the request to one or more other devices via a network to query whether another device is situated to capture a portion of the region of interest. The method also includes receiving the real-time video stream of the region of interest from a second device of the one or more other devices. The second device includes a camera having a field of view that includes at least a portion of the region of interest.

30 Claims, 7 Drawing Sheets

(56) References Cited

U.S. PATENT DOCUMENTS

| | | | |
|---|---|---|---|
| 2009/0300144 A1* | 12/2009 | Marr | A63F 13/12 |
| | | | 709/219 |
| 2013/0222598 A1 | 8/2013 | Tomar et al. | |
| 2014/0085400 A1* | 3/2014 | Kaus | G06Q 10/02 |
| | | | 348/14.03 |
| 2014/0267747 A1 | 9/2014 | Kritt et al. | |
| 2014/0292746 A1 | 10/2014 | Acharya et al. | |
| 2015/0111601 A1 | 4/2015 | Fagan | |
| 2015/0208103 A1 | 7/2015 | Guntur et al. | |
| 2015/0365632 A1 | 12/2015 | Eilertsen | |

FOREIGN PATENT DOCUMENTS

| | | |
|---|---|---|
| WO | 2016008974 A1 | 1/2016 |
| WO | 2016105880 A1 | 6/2016 |

* cited by examiner

CLOUD BASED VISION ASSOCIATED WITH A REGION OF INTEREST BASED ON A RECEIVED REAL-TIME VIDEO FEED ASSOCIATED WITH THE REGION OF INTEREST

I. FIELD

The present disclosure is generally related to cloud based vision.

II. DESCRIPTION OF RELATED ART

Advances in technology have resulted in smaller and more powerful computing devices. For example, there currently exist a variety of portable personal computing devices, including wireless computing devices, such as portable wireless telephones and smart watches, and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

In some scenarios, a user of a device (e.g., a mobile phone, an automobile, etc.) may desire to receive a live video feed of a particular area that is not within a field of view of a camera of the device. As a non-limiting example, the device may include a mobile phone and the user may be walking towards a dark alley. Before entering the dark alley, the user may wish to receive a live video feed of the dark alley (e.g., for safety). If the dark alley is not within a field of view of a camera of the mobile phone, the user may have to enter the dark alley without knowing what awaits. As another non-limiting example, the device may include an automobile and the user may attempt to reverse the direction of the automobile or switch lanes. If the automobile does not include a camera that shows a rear view or a "blind spot", there may be an increased likelihood that the user's automobile collides with an object (e.g., another automobile, a person, a dog, etc.) while attempting to reverse the direction of the automobile or while attempting to switch lanes.

III. SUMMARY

According to one implementation, a method for receiving a real-time video feed of a region of interest includes generating, at a processor of a first device, a request for a real-time video stream of the region of interest. The request indicates a location of the region of interest. The method also includes transmitting the request to one or more other devices via a network to query whether another device is situated to capture a portion of the region of interest. The method also includes receiving the real-time video stream of the region of interest from a second device of the one or more other devices. The second device includes a camera having a field of view that includes at least a portion of the region of interest.

According to another implementation, a first device for receiving a real-time video feed of a region of interest includes a memory and a processor coupled to the memory. The processor is configured to generating a request for a real-time video stream of the region of interest. The request indicates a location of the region of interest. The processor is also configured to initiate transmission of the request to one or more other devices via a network to query whether another device is situated to capture a portion of the region of interest. The processor is further configured to receive the real-time video stream of the region of interest from a second device of the one or more other devices. The second device includes a camera having a field of view that includes at least a portion of the region of interest.

According to another implementation, a non-transitory computer-readable medium includes instructions for receiving a real-time video feed of a region of interest. The instructions, when executed by a processor within a first device, cause the processor to perform operations including generating a request for a real-time video stream of the region of interest. The request indicates a location of the region of interest. The operations also include transmitting the request to one or more other devices via a network to query whether another device is situated to capture a portion of the region of interest. The operations also include receiving the real-time video stream of the region of interest from a second device of the one or more other devices. The second device includes a camera having a field of view that includes at least a portion of the region of interest.

According to another implementation, a first device for receiving a real-time video feed of a region of interest includes means for generating a request for a real-time video stream of the region of interest. The request indicates a location of the region of interest. The first device also includes means for transmitting the request to one or more other devices via a network to query whether another device is situated to capture a portion of the region of interest. The first device also includes means for receiving the real-time video stream of the region of interest from a second device of the one or more other devices. The second device includes a camera having a field of view that includes at least a portion of the region of interest.

According to another implementation, a first device for receiving a real-time video feed of a region of interest includes a processor and a memory storing instructions that are executable to cause the processor to perform operations including generating a request for a real-time video stream of the region of interest. The request indicates a location of the region of interest. The operations also include initiating transmission of the request from the first device to a server of a network. The server queries one or more other devices based on the request to determine whether another device captures a portion of the region of interest. The operations further include processing the real-time video stream of the region of interest received, via the server, from a second device of the one or more other devices. The second device includes a camera having a field of view that captures at least a portion of the region of interest.

According to another implementation, a method for receiving a real-time video feed of a region of interest includes generating, at a processor of a first device, a request for a real-time video stream of the region of interest. The request indicates a location of the region of interest. The method also includes transmitting the request from the first device to a server of a network. The server may be located on the first device, or it may be physically separate server. The server queries one or more other devices based on the request to determine whether another device captures a portion of the region of interest. The method further includes receiving, via the server, the real-time video stream of the region of interest from a second device of the one or more other devices. The second device includes a camera having a field of view that captures at least a portion of the region of interest.

According to another implementation, a non-transitory computer-readable medium includes instructions for receiving a real-time video feed of a region of interest. The instructions, when executed by a processor within a first device, cause the processor to perform operations including generating a request for a real-time video stream of the region of interest. The request indicates a location of the region of interest. The operations also include initiating transmission of the request from the first device to a server of a network. The server queries one or more other devices based on the request to determine whether another device captures a portion of the region of interest. The operations further include processing the real-time video stream of the region of interest received, via the server, from a second device of the one or more other devices. The second device includes a camera having a field of view that captures at least a portion of the region of interest.

According to another implementation, a first device for receiving a real-time video feed of a region of interest includes means for generating a request for a real-time video stream of the region of interest. The request indicates a location of the region of interest. The first device also includes means for transmitting the request from the first device to a server of a network. The server may be located on the first device, or it may be physically separate server. The server queries one or more other devices based on the request to determine whether another device captures a portion of the region of interest. The first device further includes means for receiving, via the server, the real-time video stream of the region of interest from a second device of the one or more other devices. The second device includes a camera having a field of view that captures at least a portion of the region of interest.

According to another implementation, a method for receiving a real-time video feed of a region of interest includes generating, at a processor of a first device, a request for a real-time video stream of the region of interest. The request indicates a location of the region of interest. The method also includes transmitting the request to one or more other devices in a peer-to-peer network. The first device queries the one or more other devices based on the request to determine whether another device captures a portion of the region of interest. The method also includes receiving the real-time video stream of the region of interest from a second device of the one or more other devices. The second device includes a camera having a field of view that captures at least a portion of the region of interest.

According to another implementation, a first device for receiving a real-time video feed of a region of interest includes a processor and a memory storing instructions that are executable to cause the processor to perform operations including generating a request for a real-time video stream of the region of interest. The request indicates a location of the region of interest. The operations also include initiating transmission of the request to one or more other devices in a peer-to-peer network. The first device queries the one or more other devices based on the request to determine whether another device captures a portion of the region of interest. The operations also include processing the real-time video stream of the region of interest received from a second device of the one or more other devices. The second device includes a camera having a field of view that captures at least a portion of the region of interest.

According to another implementation, a non-transitory computer-readable medium includes instructions for receiving a real-time video feed of a region of interest. The instructions, when executed by a processor within a first device, cause the processor to perform operations including generating a request for a real-time video stream of the region of interest. The request indicates a location of the region of interest. The operations also include initiating transmission of the request to one or more other devices in a peer-to-peer network. The first device queries the one or more other devices based on the request to determine whether another device captures a portion of the region of interest. The operations also include processing the real-time video stream of the region of interest received from a second device of the one or more other devices. The second device includes a camera having a field of view that captures at least a portion of the region of interest.

According to another implementation, a first device for receiving a real-time video feed of a region of interest includes means for generating a request for a real-time video stream of the region of interest. The request indicates a location of the region of interest. The apparatus also includes means for transmitting the request to one or more other devices in a peer-to-peer network. The first device queries the one or more other devices based on the request to determine whether another device captures a portion of the region of interest. The apparatus also includes means for receiving the real-time video stream of the region of interest from a second device of the one or more other devices. The second device includes a camera having a field of view that captures at least a portion of the region of interest.

V. DETAILED DESCRIPTION

Figure 1:
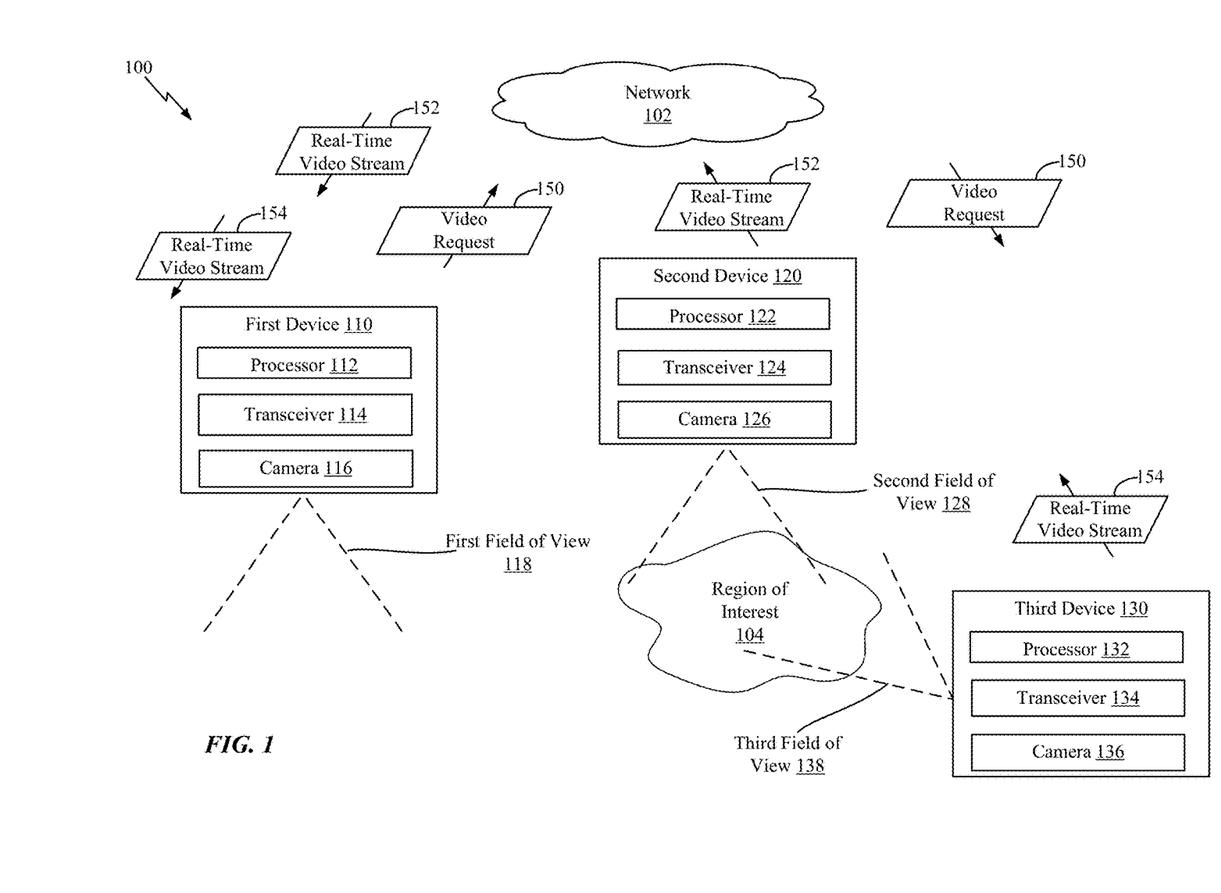
FIG. 1 is a diagram that illustrates a system for distributing real-time video streams between devices within a network.

Referring to FIG. 1, a system 100 for distributing real-time video streams between devices within a network is shown. The system 100 includes a network 102, a first device 110, a second device 120, and a third device 130. Although the system 100 is shown to include three devices 110, 120, 130, in other implementations, the system 100 may include additional (or fewer) devices. For example, according to another implementation, the system 100 may include five devices. According to yet another implementation, the system 100 may include two devices. The network 102 may be a local area network (LAN) or a wide area network (WAN).

Figure 4:
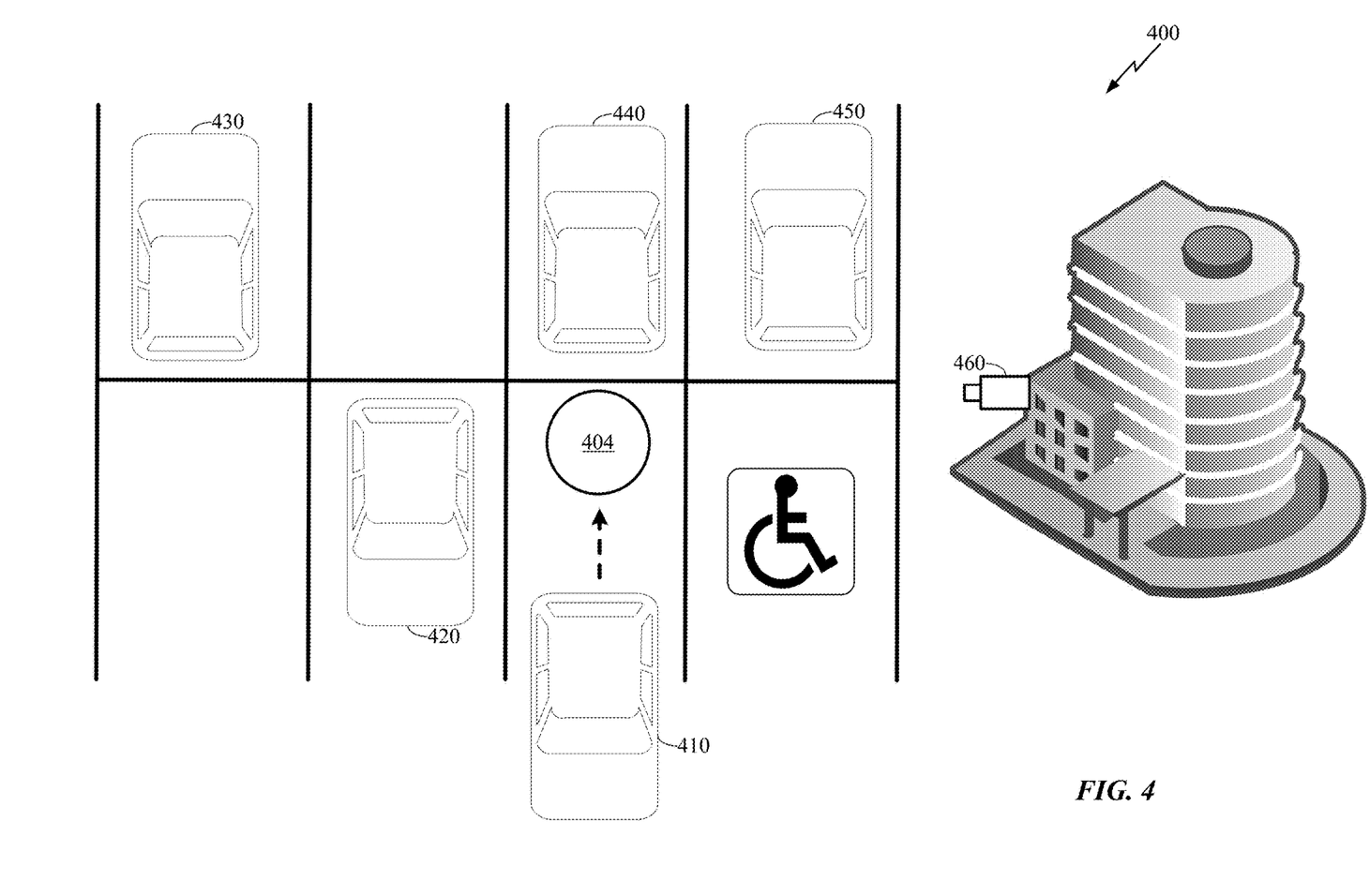
FIG. 4 illustrates a scenario for distributing real-time video streams between devices within a network.
Figure 5:
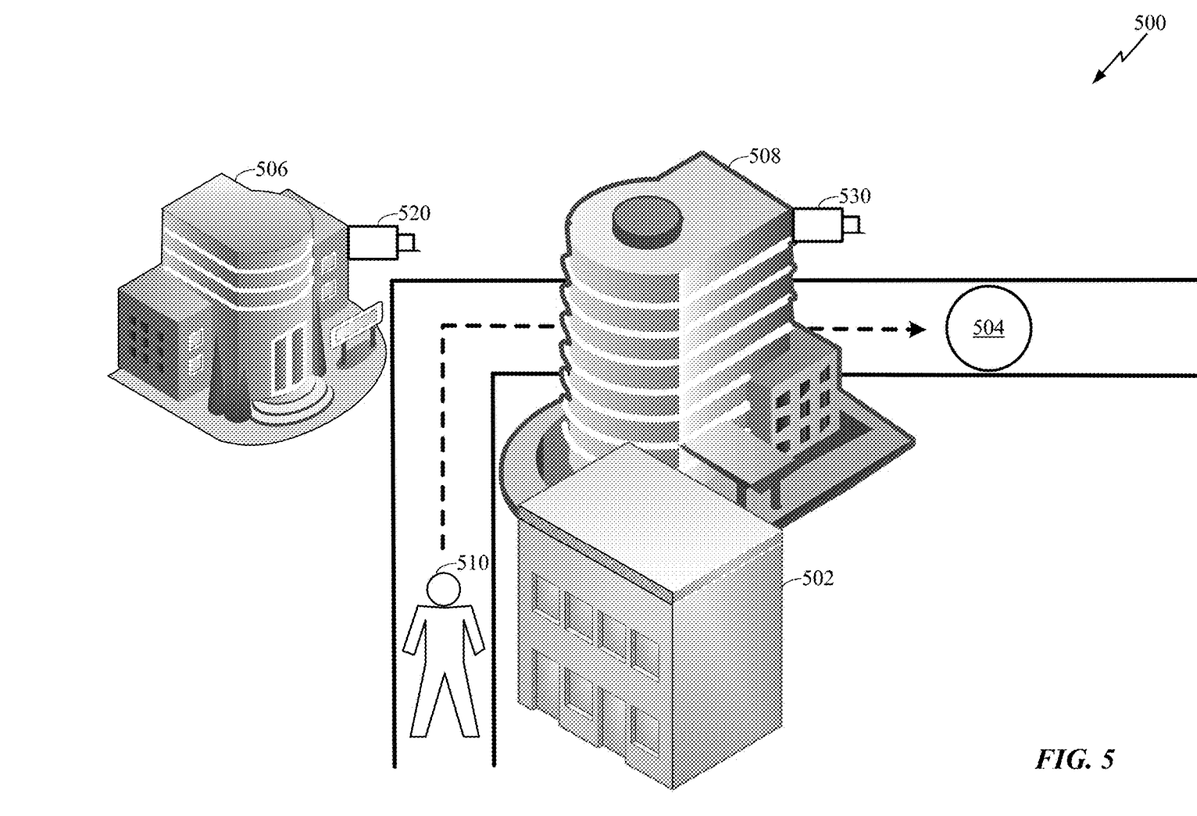
FIG. 5 illustrates another scenario for distributing real-time video streams between devices within a network.

As explained in greater detail with respect to FIGS. 4-5, the first device 110 may include one of many different user devices. However, the techniques described in the present disclosure may be implemented using a variety of user devices and should not be construed as being limited to the devices referenced with respect to FIGS. 4-5. The first device 110 includes a processor 112, a transceiver 114, and a camera 116. Although the first device 110 is shown to include the transceiver 114, in other implementations, the first device 110 may include a receiver and a transmitter. Additionally, although the first device 110 is shown to include a single camera 116, in other implementations, the first device 110 may include multiple cameras. As used herein, a "camera" may include an instrument capable of generating a digital image of a scene. The term "camera" may also include a Light Detection and Ranging (LIDAR) scanner, microwave radar, a sound navigation and ranging (SONAR) system, etc.

The camera 116 of the first device 110 may have a first field of view 118, and a user of the first device 110 may receive a real-time video feed of the first field of view 118 using the camera 116. As a non-limiting example, the camera 116 may be pointed in the direction of a tree. Upon capturing the real-time video feed of the tree using the camera 116, the first device 110 may display the real-time video feed to the user of the first device 110 using a display screen (not shown). As used herein, a "real-time video feed" corresponds to a live video feed that is delivered (or presented) with little (or no) delay. It should be understood that a "real-time video feed" as used herein may incorporate small delays associated with video processing and/or video transmission, and thus, also includes "near real-time video feeds".

In certain scenarios, the user of the first device 110 may desire to receive a real-time video feed of a region of interest 104 that is not within the first field of view 118. As a non-limiting example, the first device 110 may include a mobile phone of the user and the region of interest 104 may be located in a dark alley. For safety reasons, the user may wish to receive a real-time video feed of the dark alley before entering the dark alley. As another non-limiting example, the first device 110 may include an automobile of the user and the region of interest 104 may correspond to the user's "blind spot". To avoid collision, the user may wish to receive a real-time video feed of the blind spot before taking an action.

Because the region of interest 104 is not within the first field of view 118, the processor 112 of the first device 110 may be configured to generate a video request 150 for a real-time video stream (e.g., a real-time video feed) of the region of interest 104. The video request 150 may indicate a location of the region of interest 104. As a non-limiting example, the video request 150 may specify global positioning system (GPS) coordinates of the region of interest 104. According to other implementations, the video request 150 may include other data (or metrics) to indicate the location of the region of interest 104. For example, the video request 150 may specify the longitude and latitude of the region of interest 104, a street intersection where the region of interest 104 is located, a street name associated with the region of interest 104, etc. It should be noted that the above identified examples are not to be construed as limiting and other data (or metrics) may be used to indicate the location of the region of interest 104.

According to one implementation, the video request 150 may indicate a desired angle (or viewpoint) of the region of interest 104. For example, for a driver pulling backwards into a parking spot, the driver (e.g., the first device 110) may send out a video request 150 for an angle that covers the rear hemisphere of the vehicle. If the video request 150 indicates the desired angle, specific lobes of a coverage pattern for the network 102 may be used if steerable antennas are available, phased-array antennas are available, or diversity antennas are available. According to one implementation, the video request 150 may also indicate a desired resolution for the real-time video stream of the region of interest 104.

Table 1 indicates different information that may be included in the video request 150. It should be understood the information included in Table 1 is for illustrative purposes only and should not be construed as limiting. In other implementations, the video request 150 may include additional (or less) information.

TABLE 1

| Information Specified In Video Request | |
|---|---|
| Information | Format |
| $X_i$ | Longitude of Interest |
| $Y_i$ | Latitude of Interest |
| $Z_i$ | Altitude of Interest |
| $R_i$ | Radius of Interest |
| $Az_i$ | Azimuth of Interest |
| $El_i$ | Elevation of Interest |
| $Res_i$ | Resolution of Interest |

According to Table 1, the longitude of interest ($X_i$), the latitude of interest ($Y_i$) and the altitude of interest ($Z_i$) indicate a point substantially near the center of the region of interest 104. For example, the longitude of interest ($X_i$), the latitude of interest ($Y_i$) and the altitude of interest ($Z_i$) correspond to the area to be viewed. The radius of interest ($R_i$) describes a radius of a sphere of interest (if the region of interest 104 is substantially spherical). If any part of the sphere is within a particular camera's field of view, the particular camera may be considered a potential visual source. As described below, if a particular camera is a potential visual source, a real-time video stream associated with the particular camera may be provided to the first device 110.

The azimuth of interest ($Az_i$) and the elevation of interest ($El_i$) may define the desired angle of the region of interest 104. The azimuth of interest ($Az_i$) and the elevation of interest ($El_i$) represent a vector that extends from the point specified by the longitude of interest ($X_i$), the latitude of interest ($Y_i$), and the altitude of interest ($Z_i$). If the sphere of interest is within a field of view of a particular camera, and the vector is more than 180 degrees off the particular camera's vector (defined by an azimuth view angle ($Az$) and an elevation view angle ($El$)), the particular camera may be considered a potential visual source. The resolution of interest ($Res_i$) indicates how far the region of interest 104 can be from a particular camera whereby the particular camera is still considered to be a potential visual source. For example, if the particular camera is relatively far away from the region of interest 104, the particular camera may provide a real-time video stream (of the region of interest 104) that has a relatively low resolution.

The video request 150 may also include information (e.g., "link" information) that enables a provider of the real-time video stream to send the real-time video stream to the first device 110. For example, the video request 150 may include an internet protocol (IP) address of the first device 110, a low-energy protocol identifier of the first device 110, etc.

After generating the video request 150, the processor 112 may be configured to initiate transmission of the video request 150 from the first device 110 to a server (not shown) of the network 102 (e.g., to a "cloud"). It also may be configured to initiate transmission of the video request 150 from the first device 110 directly to other nearby devices (120, 130) For example, the processor 112 may provide the video request 150 to the transceiver 114, and the transceiver 114 may be configured to transmit the video request 150 from the first device 110 to the server of the network 102.

The server of the network 102 may query other nearby devices based on the video request 150 to determine whether another device captures a portion of the region of interest 104. For example, according to one implementation, the server may provide (e.g., forward) the video request 150 to other nearby devices. To illustrate, the server may provide the video request 150 to the second device 120 and to the third device 130. Thus, the video request 150 may be provided to the second and third devices 120, 130 using a cloud-based peer-to-peer (P2P) communication technique. According to another implementation, the server may identify parameters about the region of interest 104 from the video request 150 and send a separate query message to the other devices 120, 130 to determine whether the other devices 120, 130 capture a portion of the region of interest 104. According to one implementation, the devices 110, 120, 130 may be linked together via an application or service. For example, each device 110, 120, 130 may be subscribed to a video sharing application supported by the server of the network 102. The video sharing application may enable multiple devices (that are subscribed to the video sharing application) to share real-time video streams. Based on the subscription, the server may provide the video request 150 to the second and third devices 120, 130 and may not provide the video request 150 to other nearby devices that are not subscribed to the video sharing application. According to another implementation, the video request 150 may be sent, by the first device 110, directly to the second device 120 and to the third device 130 via direct P2P communication.

The second device 120 may include any device that is operable to capture real-time video (or "live" video) and transmit the real-time video to the network 102. As non-limiting examples, the second device 120 may include a security camera, a mobile phone, an automobile, a laptop, etc. The second device 120 includes a processor 122, a transceiver 124, and a camera 126. Although the second device 120 is shown to include the transceiver 124, in other implementations, the second device 120 may include a receiver and a transmitter. Additionally, although the second device 120 is shown to include a single camera 126, in other implementations, the second device 120 may include multiple cameras.

The transceiver 124 may receive the video request 150 from the network 102 and may provide the video request 150 to the processor 122. Upon receiving the video request 150, the processor 122 may be configured to determine the location of the region of interest 104 specified in the video request 150. Based on the location of the region of interest 104, the processor 122 may initiate an evaluation process. For example, the processor 122 compares the location of the second device 120, the viewing angle of the camera 126, and a resolution of the camera 126 to the information in the video request 150. If there is a match, the camera 126 may be a potential visual source.

Thus, before determining whether a match is present, the processor 122 may determine attributes associated with the camera 126 and a second field of view 128 of the camera 126. Table 2 indicates different information about the camera 126 that may be provided to the processor 122. It should be understood the information included in Table 2 is for illustrative purposes only and should not be construed as limiting. In other implementations, additional (or less) information may be provided to the processor 122.

TABLE 2

Camera Information of Provider Device

| Information | Format |
| --- | --- |
| X | Longitude |
| Y | Latitude |
| Z | Altitude |
| Az | View Azimuth |
| El | View Elevation |
| Rot | View Rotation |
| Az Angle | Azimuth View Angle |
| El Angle | Elevation View Angle |
| Az Resolution | Azimuth Resolution |
| El Resolution | Elevation Resolution |

According to Table 2, the longitude (X) and the latitude (Y) may be constant (if the camera 126 is fixed) or may be supplied by a GPS or other navigation system (if the camera 126 is mobile). The altitude (Z) may be constant (if the camera 126 is fixed) or may be provided by an altimeter, a GPS, or similar navigation system (if the camera 126 is mobile). The view azimuth (Az) and the view elevation (El) may be constant (if the camera 126 is fixed) or may be a reported gimbal position. In scenarios where the camera 126 is mobile (e.g., a cell phone camera or a laptop camera), the view azimuth (Az) and the view elevation (El) may be dynamically determined (e.g., determined "on the fly") using sensors (e.g., an accelerometer or a three-axis gyroscope sensor) integrated with the camera 126 or using a navigation system. The view rotation (Rot) indicates the rotation angle of the camera 126 with respect to the second field of view 128.

The elevation view angle (El Angle) and the azimuth view angle (Az Angle) indicate the angle of view in azimuth and elevation, respectively. The view angles of some cameras may enable the cameras to capture a relatively good view of the region of interest 104. According to some implementations, a score may be determined (e.g., calculated) to indicate the quality of the view angles. For example, a good view angle (indicated by a high score) may face 180 degrees to the direction of interest. Alternatively, the view angles of some cameras may be poor. For example, the view angles may be closer to 90 degree off the direction of interest. In this scenario, the score would be set to a low value, indicating a potentially poor view. The azimuth resolution (Az Resolution) and the elevation resolution (El Resolution) indicate the resolution in pixels in each direction.

The processor 122 may compare the information in Table 2 to the information in the video request 150 (e.g., the information in Table 1) to determine whether the camera 126 is a potential visual source. For example, the processor 122 may be configured to determine whether the camera 126 captures the region of interest 104 (or a portion of the region of interest 104). To illustrate, the camera 126 of the second device 120 may have the second field of view 128. If the processor 122 determines that the second field of view 128 captures a portion of the region of interest 104, the processor 122 may generate a real-time video stream 152 (e.g., a live video feed) of the portion of the region of interest 104 captured by the camera 126.

The real-time video stream 152 may include the link information in the video request 150 such that the destination of the real-time video stream 152 is the first device 110. The processor 122 may provide the real-time video stream 152 to the transceiver 124, and the transceiver 124 may be configured to transmit the real-time video stream 152 to the server of the network 102. In some cases, the server may provide (e.g., forward) the real-time video stream 152 to the first device 110. In other cases, the transmitter 124 may be configured to transmit the real-time video stream 154 directly to the first device 110. Upon receiving the real-time video stream 152, the user of the first device 110 may view live video feeds of the region of interest 104 using the display screen of the first device 110. The real-time video stream 152 may be sent to the first device 110 using a standard video-compression format. As a non-limiting example, the real-time video stream 152 may be sent to the first device 110 using a Moving Picture Experts Group (MPEG) format.

In a similar manner as the second device 120, the third device 130 may include any device that is operable to capture real-time video (or "live" video) and transmit the real-time video to the network 102. As non-limiting examples, the third device 130 may include a security camera, a mobile phone, an automobile, a laptop, etc. The third device 130 includes a processor 132, a transceiver 134, and a camera 136. Although the third device 130 is shown to include the transceiver 134, in other implementations, the third device 130 may include a receiver and a transmitter. Additionally, although the third device 130 is shown to include a single camera 136, in other implementations, the third device 130 may include multiple cameras.

The transceiver 134 may receive the video request 150 from the network 102 and may provide the video request 150 to the processor 132. Upon receiving the video request 150, the processor 132 may be configured to determine the location of the region of interest 104 specified in the video request 150 and to determine whether the camera 136 captures the region of interest 104 (or a portion of the region of interest 104). For example, the camera 136 of the third device 130 may have a third field of view 138. If the processor 132 determines that the third field of view 138 captures a portion of the region of interest 104, the processor 132 may generate a real-time video stream 154 (e.g., a live video feed) of the portion of the region of interest 104 captured by the camera 136. The processor 132 may provide the real-time video stream 154 to the transceiver 134, and the transceiver 134 may be configured to transmit the real-time video stream 154 to the server of the network 102. In some cases, the server may provide (e.g., forward) the real-time video stream 154 to the first device 110. In other cases, the transmitter 134 may be configured to transmit the real-time video stream 154 directly to the first device 110. Upon receiving the real-time video stream 154, the user of the first device 110 may view live video feeds of the region of interest 104 using the display screen of the first device 110. According to one implementation, the real-time video stream 150 and the real-time video stream 154 may be combined (by the first device 110 or by the server) to generate a single real-time video stream.

The system 100 of FIG. 1 may support transmission of wireless messages (e.g., advertisements) associated with cloud-based P2P ad hoc networks. For example, a requesting device may send an advertisement to other devices in a cloud-based P2P ad hoc network for a live video stream of a region. If there is a visual source that can capture the region, the visual source connects and sends a live stream of the region to the requesting device via the server. According to some implementations, the cloud-based P2P ad hoc networks may include a Bluetooth® Low Energy (BLE) network, a Neighbor Aware Network (NAN), etc. Bluetooth® is a registered trademark that is owned by Bluetooth Sig, Inc. of Kirkland, Wash.

According to a BLE network, the first device 110 may be a requestor that operates in a peripheral/slave role within BLE. The first device 110 may generate a BLE advertisement that includes the video request 150. The BLE standard may allow up to 37 bytes for a payload (e.g., a BLE advertisement). The payload may include the video request 150. As a non-limiting example of byte allocation, 4 bytes may be allocated to the longitude of interest (Xi), four bytes may be allocated to the latitude of interest (Yi), three bytes may be allocated to the altitude of interest (Zi), three bytes may be allocated to the radius of interest (Ri), one byte may be allocated to the azimuth of interest (Azi), one byte may be allocated to the elevation of interest (Eli), and two bytes may be allocated to the requested resolution (Resi).

The requestor may send the BLE advertisement and any provider (e.g., the second device 120 and/or the third device 130) within range may receive the advertisement. A particular provider may compare the information (e.g., the video request 150) in the BLE advertisement to the particular provider's view of the region of interest 104. If the particular provider determines that there is a match (e.g., determines that the information substantially matches the particular provider's view), the particular provider may send a connection request to the requestor and the two devices may "pair".

Once the devices are paired, the requestor may request an attribute (e.g., a data report) from the particular provider. The particular provider sends a report (to the requestor) indicating properties of the particular provider's view. According to one implementation, the report may include information in Table 2. As a non-limiting example, one byte of the report may be allocated to a camera identifier, one byte may be allocated to indicate the score, four bytes may be allocated to indicate the longitude of view origin (X), four bytes may be allocated to indicate the latitude of view origin (Y), and three bytes may be allocated to indicate the altitude of view origin (Z). Additionally, one byte may be allocated to indicate the azimuth of view (Az), one byte may be allocated to indicate the elevation of view (El), one byte may be allocated to indicate the rotation angle of view (Rot), and one byte may be allocated to indicate the elevation view angle (El Angle). In addition, one byte may be allocated to indicate the azimuth view angle (Az Angle), two bytes may be allocated to indicate the horizontal resolution (Az resolution), and two bytes may be allocated to indicate the vertical resolution (Ez resolution).

If the particular provider has multiple cameras, the particular provider may provide multiple reports to the requestor (e.g., one report for each camera). If the provider provides multiple reports, the requestor may request additional view attributes from the provider for each camera. Upon receiving the additional view attributes, the requestor may determine select a particular camera (from the provider) to receive a real-time video stream.

According to some implementations, the provider may provide the score to the requester in the report. The score may indicate the relevance of the view. If there is a very small area of intersection between the camera's field of view (e.g., the second field of view 128 or the third field of view 138) and the region of interest 104, the score may be relatively low, indicating the view may not be useful. If there is a large area of intersection (e.g., if a large part of the region of interest 104 is within the camera's field of view and the camera is facing close to 180 degrees from the requested view vector), the score may be relatively high.

If the particular provider "connects" to (e.g., provides a real-time video stream with) the requestor, and after the connection, the requestor determines that the particular provider does not have a suitable view of the region of interest 104, the requestor may terminate the connection and may ignore future connection requests from the particular provider. However, if the connection is established and the requestor determines that the view of the particular provider is useful, the requestor may request data from a specific camera of the particular provider.

The system 100 of FIG. 1 may enable the user of the first device 110 to receive real-time video feeds of surrounding areas (e.g., the region of interest 104) that are not within the first field of view 118 by using real-time video feeds of other devices 120, 130. According to some illustrations, the system 100 may also utilize a small amount of bandwidth. For example, if the first device 110 sends the video request 150 via a LAN, request traffic may be relatively small compared to sending the video request 150 via a WAN. Additionally, in some scenarios, the other devices 120, 130 may only reply to the video request 150 if the cameras 126, 136 meet the criteria specified in the video request 150. Thus, the image traffic (e.g., the traffic associated with the real-time video streams 152, 154) may be relatively small because particular cameras may not meet the criteria specified in the video request 150, and thus may not send real-time video streams.

Figure 2:
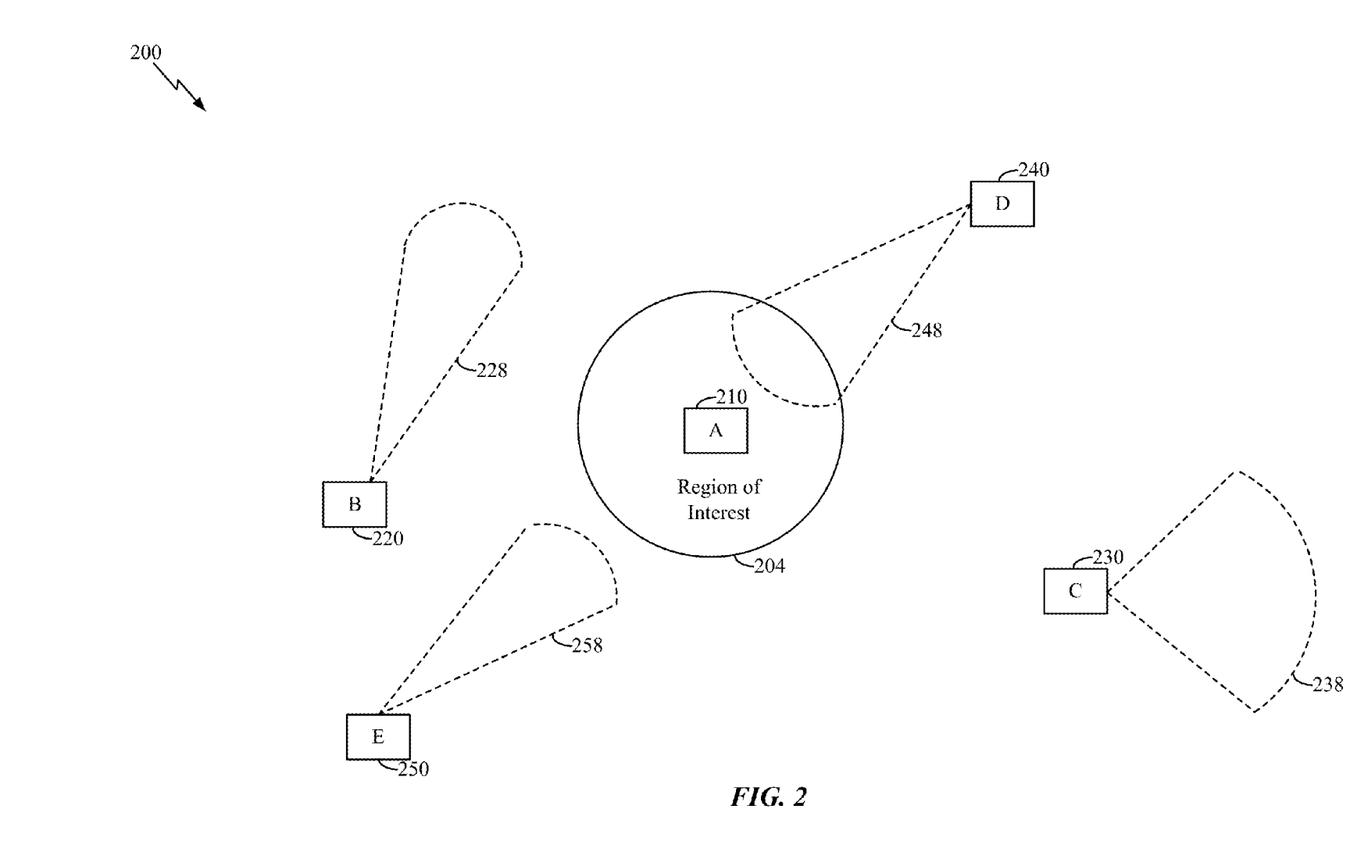
FIG. 2 is another diagram that illustrates a system for distributing real-time video streams between devices within a network.

Referring to FIG. 2, another system 200 for distributing real-time video streams between devices within a network is shown. The system 200 includes a device (A) 210, a device (B) 220, a device (C) 230, a device (D) 240, and a device (E) 250. Although the system 200 is shown to include five devices 210, 220, 230, 240, 250, in other implementations, the system 200 may include additional (or fewer devices). For example, according to another implementation, the system 200 may include eight devices. The devices 210, 220, 230, 240, 250 may communicate with one another via a network (not shown), such as a LAN or a WAN.

Each device 210, 220, 230, 240, 250 in FIG. 2 may include similar components and may operate is a substantially similar manner as the devices 110, 120, 130 in FIG. 1. The device (A) 210 may send a video request for a real-time video stream (e.g., a real-time video feed) of a region of interest 204 to a server, and the server may forward the video request to the other devices 220, 230, 240, 250. The video request may include substantially similar information as the video request 150 of FIG. 1. The device (A) 210 may send the video request directly to the other devices 220, 230, 240, 250 using an omnidirectional transmitter in a LAN. According to the implementation described with respect to FIG. 2, the video request does not specify a desired view angle for the region of interest 204.

Each device 220, 230, 240, 250 may receive the video request from the device (A) 210 and may evaluate the video request. A field of view 228 of a camera of the device (B) 220 and a field of view 238 of a camera of the device (C) are pointed away from the region of interest 204. Thus, the device (B) 220 and the device (C) 230 may ignore the video request from the device (A) 210 because the devices 220, 230 are facing the wrong direction and fail to capture the region of interest 204. A field of view 258 of a camera of the device (E) 250 may be aimed towards the region of interest 204. However, the resolution limit of the camera of the device (E) 250 may be insufficient to capture the region of interest 204 with sufficient clarity. Thus, the device (E) 250 may ignore the video request from the device (A) 210. According to FIG. 2, the resolution limit of the camera of the device (E) 250 is illustrated by the curved dotted line of the field of view 258. For example, the curved dotted line of the field of view 258 illustrates the limit at which the camera of the device (E) 250 may capture an image with sufficient clarity.

A field of view 248 of a camera of the device (D) 240 may be aimed at the region of interest 204, and the resolution of the camera of the device (D) 240 may be sufficient to intersect the region of interest 204. As a result, the device (D) 240 may send a real-time video stream of the region of interest 204 to the device (A) 210 according to the techniques described with respect to FIG. 1.

Figure 3:
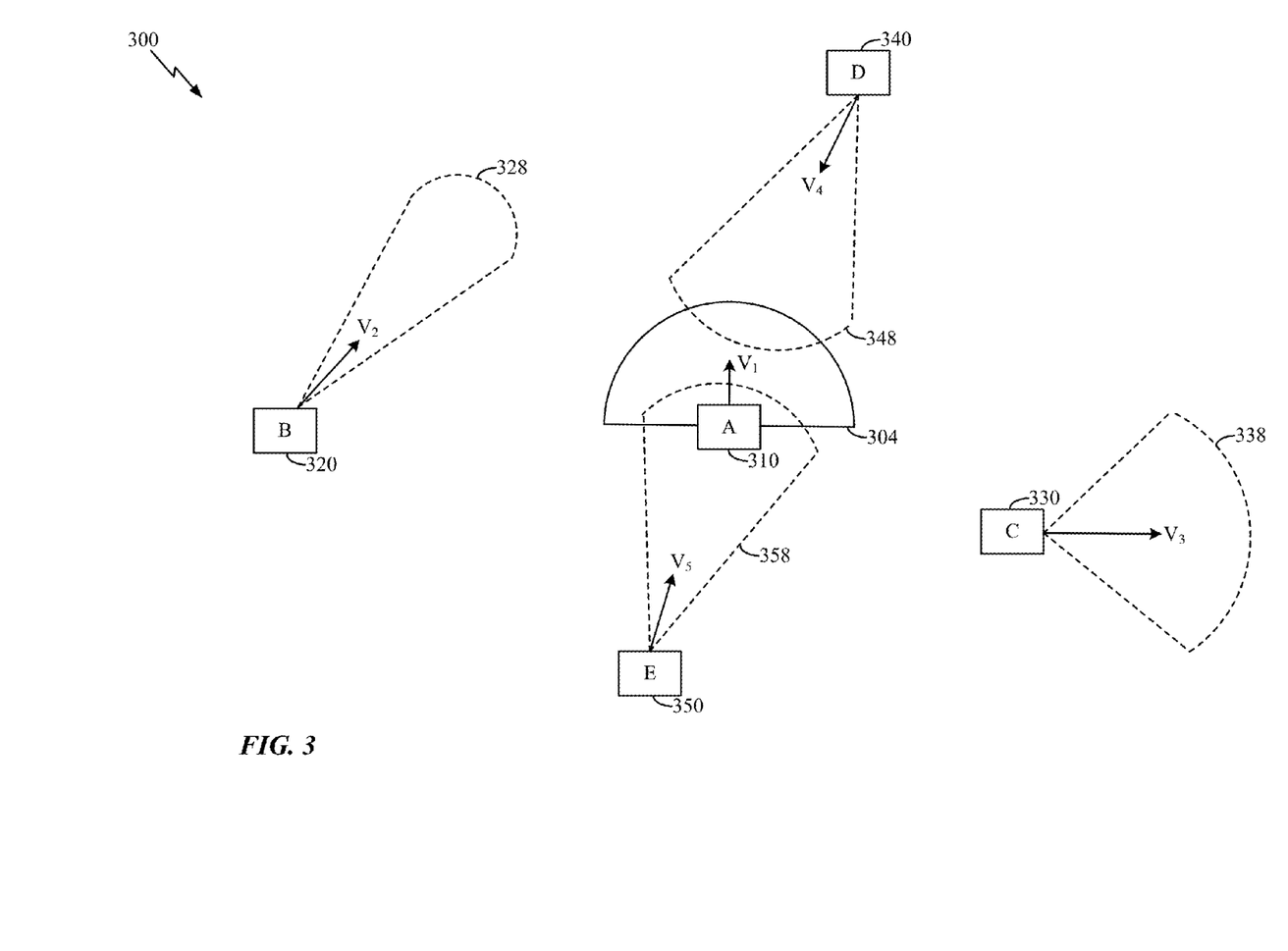
FIG. 3 is another diagram that illustrates a system for distributing real-time video streams between devices within a network.

Referring to FIG. 3, another system 300 for distributing real-time video streams between devices within a network is shown. The system 300 includes a device (A) 310, a device (B) 320, a device (C) 330, a device (D) 340, and a device (E) 350. Although the system 300 is shown to include five devices 310, 320, 330, 340, 350, in other implementations, the system 300 may include additional (or fewer devices). For example, according to another implementation, the system 300 may include twelve devices. The devices 310, 320, 330, 340, 350 may communicate with one another via a network (not shown).

Each device 310, 320, 330, 340, 350 in FIG. 3 may include similar components and may operate is a substantially similar manner as the devices 110, 120, 130 in FIG. 1. The device (A) 310 may send a video request for a real-time video stream (e.g., a real-time video feed) of a region of interest 304 to a server, and the server may send the video request to the other devices 320, 330, 340, 350. The video request may include substantially similar information as the video request 150 of FIG. 1. According to the implementation described with respect to FIG. 3, the video request specifies a desired view angle, represented by a vector ($V_1$), for the region of interest 304.

Each device 320, 330, 340, 350 may receive the video request from the device (A) 310 and may evaluate the video request. A field of view 328 of a camera of the device (B) 320 and a field of view 338 of a camera of the device (C) are pointed away from the region of interest 304. Thus, the device (B) 320 and the device (C) 330 may ignore the video request from the device (A) 310 because the devices 320, 330 are facing the wrong direction and fail to capture the region of interest 304. A field of view 358 of a camera of the device (E) 350 may be aimed at the region of interest 304, and the resolution limit of the camera of the device (E) 350 may be sufficient to capture the region of interest 304 with sufficient clarity. However, a view angle, represented by a vector ($V_5$), of the field of view 358 is substantially similar to the desired view angle ($V_1$). Thus, the device (E) 350 may ignore the video request from the device (A) 310. Note that in this case a similar view angle represents an undesirable angle, since the desired view angle will be 180 degrees from the requested view angle.

A field of view 348 of a camera of the device (D) 340 may be aimed at the region of interest 304, and the resolution limit of the camera of the device (D) 340 may be sufficient to capture the region of interest 304 with sufficient clarity. In addition, a view angle, represented by vector ($V_4$), of the field of view 348 may be substantially close to (e.g., within a threshold of) 180 degrees from the desired view angle ($V_1$). Because the vector ($V_1$) is approximately 180 degrees different from the vector ($V_4$), the vectors (V1, V4) may be pointing towards one another. If the vectors are vectors (V1, V4) are pointing towards one another, the camera of the device (D) is pointed towards the desired field of view. The device (D) 340 may send a real-time video stream of the region of interest 304 to the device (A) 310 according to the techniques described with respect to FIG. 1. As used herein, a view angle may be close enough to 180 degrees from the desired view angle ($V_1$) to satisfy the condition to transmit real-time video if the view angle is within a particular range. As a non-limiting example, the particular range may be between 150 degrees and 210 degrees from the desired view angle ($V_1$). As another non-limiting example, the particular range may be between 135 degrees and 225 degrees from the desired view angle ($V_1$).

Referring to FIG. 4, a scenario 400 for distributing real-time video streams between devices within a network is shown. The scenario 400 of FIG. 4 depicts a parking lot that includes multiple parking spaces.

According to the scenario 400, a user of an automobile 410 may attempt to reverse into a particular parking space. The user may send a video request for a real-time video stream of a region of interest 404 to a server, and the server may send the video request to other devices within the area according to the techniques described with respect to FIG. 1. For example, the video request may be sent to an automobile 420, an automobile 430, an automobile 440, an automobile 450, and a security camera 460. It should be understood that the video request may be sent to any device within proximity that is operable to capture a real-time video stream and transmit the real-time video stream to the automobile 410. Thus, the devices illustrated in FIG. 4 are merely non-limiting examples and are not to be construed as limiting.

Each automobile 420, 430, 440, 450 and the security camera 460 may evaluate the video request according to the techniques described with respect to FIG. 1 to determine whether a real-time video stream of the region of interest 404 may be obtained. In response to a particular device determining that a real-time video stream of the region of interest 404 may be obtained, the particular device may send the real-time video stream to the automobile 410 according to the techniques described with respect to FIG. 1.

For example, the automobile 440 may process the video request and determine that a camera of the automobile 440 may capture the region of interest 404. In response to determining the camera of the automobile 440 may capture the region of interest 404, the automobile 440 may send a real-time video stream of the region of interest 404 to the automobile 410. In a similar manner, the security camera 460 may process the video request and determine that the region of interest 404 is within a field of view of the security camera 460. In response to determining the region of interest 404 is within the field of view of the security camera 460, the security camera 460 may send a real-time video stream of the region of interest 404 to the automobile 410.

Thus, the user of the automobile 410 may receive real-time video feeds of the region of interest 404 by using real-time video feeds of the automobile 440 and the security camera 460. By receiving the real-time video feeds from the automobile 440 and the security camera 460, the user of the automobile 410 may be able view behind the automobile while reversing into the parking space to reduce a likelihood of collision with the automobile 440.

Referring to FIG. 5, another scenario 500 for distributing real-time video streams between devices within a network is shown. The scenario 500 of FIG. 5 depicts a user 510 of a mobile device (not shown) walking around a corner.

According to the scenario 500, the user 510 may not be able to see what awaits around the corner because the user's 510 vision is blocked by one or more buildings 502, 506, 508. The user 510 may send a video request (via the mobile device) for a real-time video stream of a region of interest 504 to a server, and the server may send the video request to other devices within the area according to the techniques described with respect to FIG. 1. For example, the video request may be sent to a security camera 520 attached to the building 506 and to a security camera 530 attached to the building 530. It should be understood that the video request may be sent (by a server) to any device within proximity that is operable to capture a real-time video stream and transmit the real-time video stream to the mobile device of the user 510. Thus, the security cameras 520, 530 illustrated in FIG. 5 are merely non-limiting examples and are not to be construed as limiting.

Each security camera 520, 530 may evaluate the video request according to the techniques described with respect to FIG. 1 to determine whether a real-time video stream of the region of interest 504 may be obtained. In response to a particular security camera 520, 530 determining that a real-time video stream of the region of interest 504 may be obtained, the particular security camera 520, 530 may send the real-time video stream to the mobile device of the user 510 according to the techniques described with respect to FIG. 1.

For example, the security camera 520 may process the video request and determine that the region of interest 504 is within a field of view of the security camera 520. In response to determining that the region of interest 504 is within the field of view of the security camera 520, the security camera 520 may send a real-time video stream of the region of interest 504 to the mobile device of the user 510. In a similar manner, the security camera 530 may process the video request and determine that the region of interest 504 is within a field of view of the security camera 530. In response to determining that the region of interest 504 is within the field of view of the security camera 530, the security camera 530 may send a real-time video stream of the region of interest 504 to the mobile device of the user 510.

Thus, the user 510 may receive real-time video feeds of the region of interest 504 by using real-time video feeds of the security camera 520, 530. By receiving the real-time video feeds from the security cameras 520, 530, the user 510 may determine whether any potential dangers await around the corner before walking around the corner.

The scenarios 400, 500 of FIGS. 4-5 are merely non-limiting applications of the techniques described herein and should not be construed as limiting. It should be understood that the techniques described herein may be applied to other applications. As non-limiting examples, pilots may benefit from being able to see additional views of an aircraft, truck drivers may benefit from being able to see atop of their trucks, train operators may be able to inspect their train as it passes stationary cameras to identify illegal riders, etc. Additionally, hikers may be alerted to inclement weather further along a trail by requesting real-time video streams from mobile devices of hikers that are further along the trail.

Ambulance drivers may also use the techniques described herein to view intersections prior to running a red light to ensure that traffic is stopped. As a result, an ambulance driver may not need to slow down to have a good view of the intersection, and thus, transit time may be reduced. As another non-limiting example, operators of remote unmanned aerial vehicle (UAV) may use the techniques described herein to receive a real-time video feed from a corridor having overlapping visual coverage of the UAV to provide the operators with a "line of sight" according to the Federal Aviation Administration (FAA) rules. As another non-limiting example, the techniques used herein may be used to capture "selfies" without using "selfie-sticks".

Figure 6:
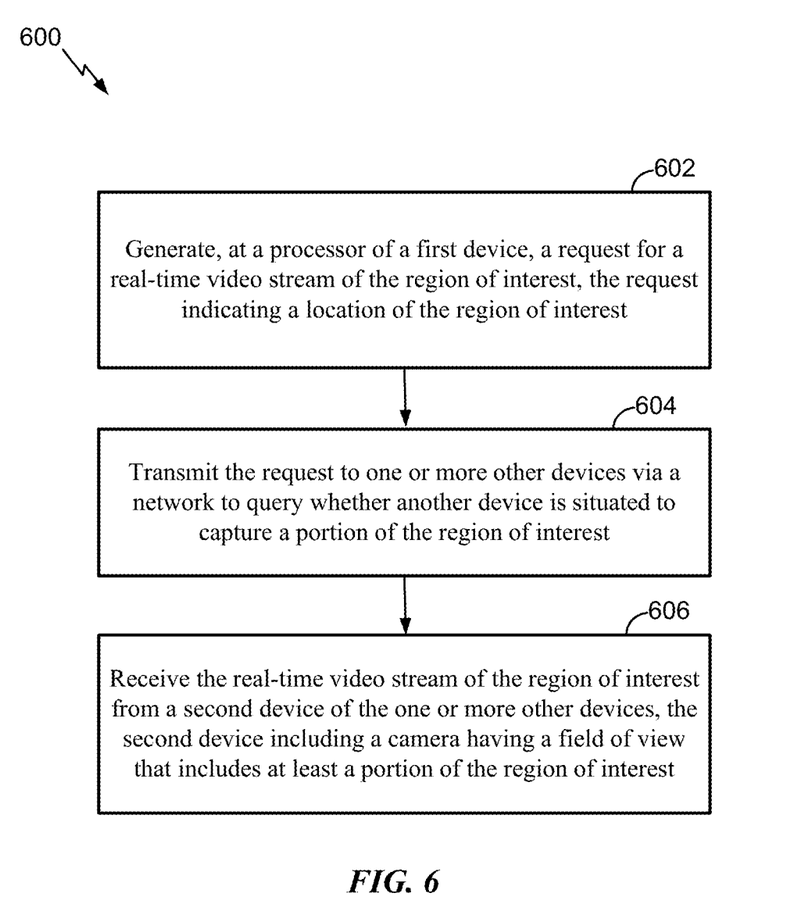
FIG. 6 is a flow diagram of a method for distributing real-time video streams between devices within a network.

Referring to FIG. 6, a method 600 for distributing real-time video streams between devices within a network is shown. The method 600 may be performed at the device 110 of FIG. 1, the device (A) 210 of FIG. 2, the device (A) 310 of FIG. 3, the automobile 410 of FIG. 4, the mobile phone of the user 510 of FIG. 5, or another device.

The method 600 includes generating, at a processor of a first device, a request for a real-time video stream of a region of interest, at 602. The request may indicate a location of the region of interest. For example, referring to FIG. 1, the processor 112 of the first device 110 may be configured to generate the video request 150 for a real-time video stream (e.g., a real-time video feed) of the region of interest 104. The video request 150 may indicate a location of the region of interest 104. As a non-limiting example, the video request 150 may specify GPS coordinates of the region of interest 104. According to other implementations, the video request 150 may include other data (or metrics) to indicate the location of the region of interest 104. For example, the video request 150 may specify the longitude of the region of interest 104, the latitude of the region of interest 104, the altitude of the region of interest 104, or a combination thereof.

The request may be transmitted from the first device to one or more devices via a network to query whether another device is situated to capture a portion of the region of interest, at 604. According to one implementation, the network includes a peer-to-peer network. According to another implementation, the network includes a server-based network. A server of the server-based network may query the one or more other devices based on the request to determine whether another device captures a portion of the region of interest. For example, referring to FIG. 1, the processor 112 may initiate transmission of the video request 150 from the first device 110 to the server of the network 102 (e.g., to a "cloud"). To illustrate, the processor 112 may provide the video request 150 to the transceiver 114, and the transceiver 114 may transmit the video request 150 from the first device 110 to the server of the network 102. The server of the network 102 may query other nearby devices (e.g., forward the video request 150 to other nearby devices) to determine whether another device captures a portion of the region of interest 104. For example, the server may provide the video request 150 to the second device 120 and to the third device 130. In other cases, the transceiver 114 may transmit the video request directly to the second device 120 and third device 130.

The real-time video stream of the region of interest may be received from a second device of the one or more other devices, at 606. The second device includes a camera having a field of view that includes at least a portion of the region of interest. For example, referring to FIG. 1, the processor 122 of the second device 120 may provide the real-time video stream 152 to the transceiver 124, and the transceiver 124 may transmit the real-time video stream 152 to the server of the network 102. The server may provide (e.g., forward) the real-time video stream 152 to the first device 110. According to one implementation, the method 600 includes displaying the real-time video stream 152 at the first device 110. For example, upon receiving the real-time video stream 152, the user of the first device 110 may view live video feeds of the region of interest 104 using the display screen of the first device 110. According to one implementation, the real-time video stream 152 may be sent to the first device 110 using a MPEG format.

According to one implementation of the method 600, the first device and the one or more other devices are subscribed to a video sharing application. The request may include an internet protocol address of the first device. According to one implementation of the method 600, the request indicates a desired viewing angle of the region of interest for the real-time video stream. According to another implementation of the method 600, the request indicates a resolution limit of the region of interest for the real-time video stream.

According to one implementation, the method 600 includes receiving a second real-time video stream of the region of interest from a third device of the one or more devices. The third device may include a camera having a field of view that captures at least a portion of the region of interest. According to one implementation of the method 600, the real-time video stream and the second real-time video stream may be combined to generate a single real-time video stream.

The method 600 of FIG. 6 may enable the user of the first device 110 to receive real-time video feeds of surrounding areas (e.g., the region of interest 104) that are not within the first field of view 118 by using real-time video feeds of other devices 120, 130. The method 600 may also utilize a small amount of bandwidth. For example, because the other devices 120, 130 only reply to the video request 150 if the cameras 126, 136 criteria meet the criteria specified in the video request 150, the image traffic (e.g., the traffic associated with the real-time video streams 152, 154) may be relatively small.

Figure 7:
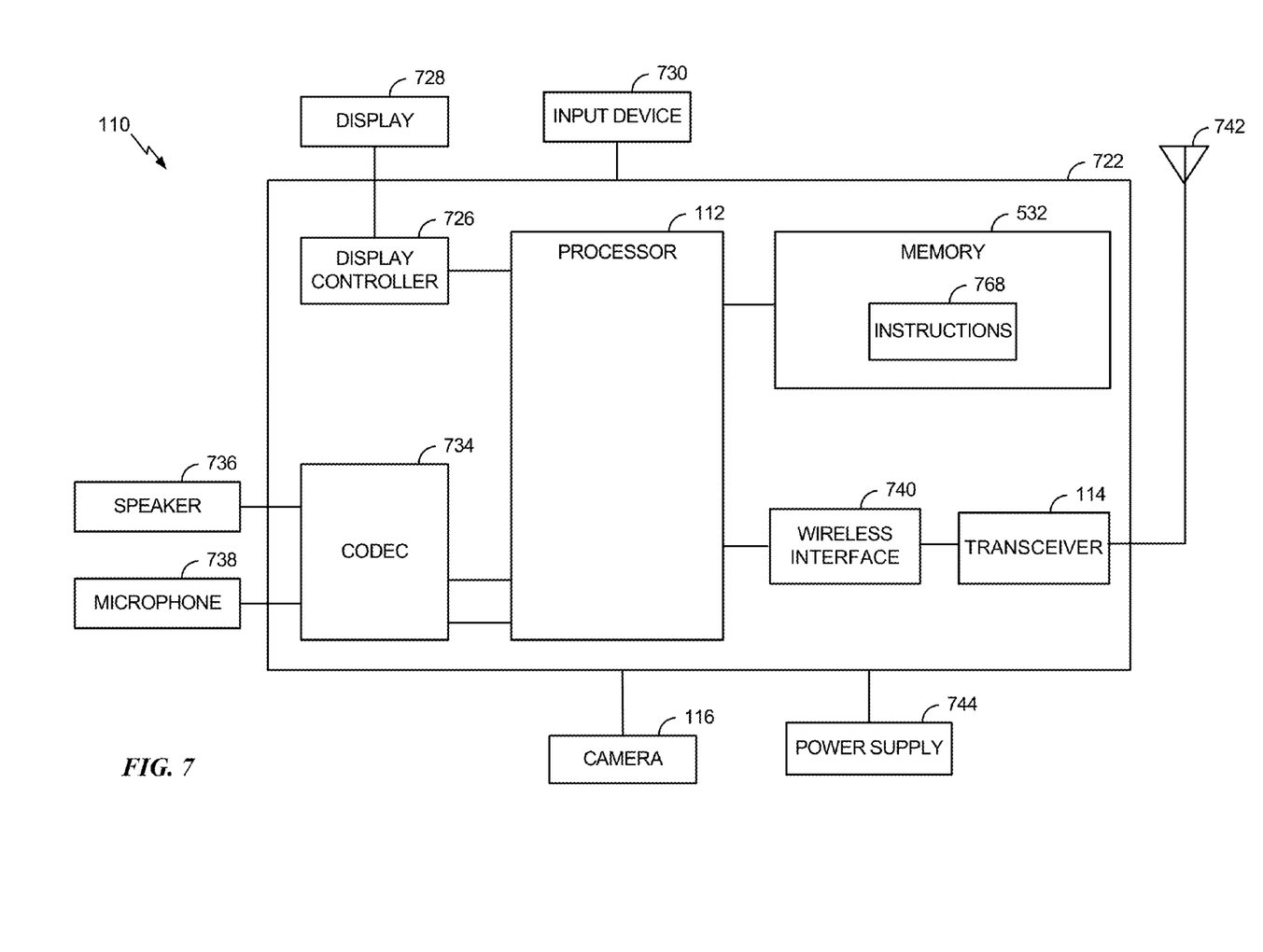
FIG. 7 is a diagram of a device that is operable to support various implementations of one or more methods, systems, apparatuses, and/or computer-readable media disclosed herein.

Referring to FIG. 7, another implementation of the device 110 is shown. The device 110 includes the processor 112, such as a digital signal processor or central processing unit, coupled to a memory 732.

The processor 112 may be configured to execute software, such as a program of one or more instructions 768, stored in the memory 732. Additionally or alternatively, the processor 710 may be configured to execute one or more instructions stored in a memory of a wireless interface 740, such as an IEEE 802.11 interface configured to operate in accordance with an IEEE 802.11 standard. In some implementations, the processor 112 may be configured to operate in accordance with the method 600 of FIG. 6. For example, the processor 112 may generate a request for a real-time video stream of a region of interest.

The wireless interface 740 may be coupled to the processor 112 and to an antenna 742. For example, the wireless interface 740 may be coupled to the antenna 742 via the transceiver 114. In some implementations, the transceiver 114 may be configured to operate in accordance with the method 600 of FIG. 6. For example, the transceiver 114 may transmit the request to a server of a network and may receive real-time video stream of a region of interest from one or more other devices.

A coder/decoder (CODEC) 734 can also be coupled to the processor 112. A speaker 736 and a microphone 738 can be coupled to the CODEC 734. A display controller 726 can be coupled to the processor 112 and to a display device 728. In a particular implementation, the processor 112, the display controller 726, the memory 732, the CODEC 734, and the wireless interface 740 are included in a system-in-package or system-on-chip device 722. In a particular implementation, the camera 116, an input device 730 and a power supply 744 are coupled to the system-on-chip device 722. Moreover, in a particular implementation, as illustrated in FIG. 7, the display device 728, the input device 730, the speaker 736, the microphone 738, the antenna 742, the camera 116, and the power supply 744 are external to the system-on-chip device 722. However, each of the display device 728, the input device 730, the speaker 736, the microphone 738, the antenna 742, the camera 116, and the power supply 744 can be coupled to one or more components of the system-on-chip device 722, such as one or more interfaces or controllers.

In conjunction with the described techniques, a first device includes means for generating a request for a real-time video stream of a region of interest. The request may indicate a location of the region of interest and a viewpoint of the region of interest. For example, the means for generating the request may include the processor 112 of FIG. 1, a processor of the device (A) 210 of FIG. 2, a processor of the device (A) 310 of FIG. 3, the automobile 410 of FIG. 4, the mobile phone of the user 510 of FIG. 5, the processor 112 programmed to execute the instructions 768 of FIG. 7, one or more other devices, circuits, modules, or any combination thereof.

The first device may also include means for transmitting the request from the first device to a server of a network. The server may query one or more other devices based on the request to determine whether another device captures a portion of the region of interest. For example, the means for transmitting may include the transceiver 114 of FIGS. 1 and 7, a transceiver of the device (A) 210 of FIG. 2, a transceiver of the device (A) 310 of FIG. 3, the automobile 410 of FIG. 4, the mobile phone of the user 510 of FIG. 5, the antenna 742 of FIG. 7, the wireless interface 740 of FIG. 7, one or more other devices, circuits, modules, or any combination thereof.

The first device may also include means for receiving, via the server, the real-time video stream of the region of interest from a second device of the one or more other devices. The second device may include a camera having a field of view that captures at least a portion of the region of interest from the viewpoint. For example, the means for receiving may include the transceiver 114 of FIGS. 1 and 7, a transceiver of the device (A) 210 of FIG. 2, a transceiver of the device (A) 310 of FIG. 3, the automobile 410 of FIG. 4, the mobile phone of the user 510 of FIG. 5, the antenna 742 of FIG. 7, the wireless interface 740 of FIG. 7, one or more other devices, circuits, modules, or any combination thereof.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (or non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A first device for receiving a real-time video feed of a region of interest, the first device comprising:
    a memory;
    a processor coupled to the memory and configured to:
        generate a request for a real-time video stream of the region of interest, the request indicating a location of the region of interest;
        initiate transmission of the request to one or more other devices via a network to query whether another device is situated such that a field of view of the other device captures at least a portion of an object located in the region of interest; and
        receive an indication of a score associated with a second device of the one or more other devices, wherein the indication of the score associated with the second device of the one or more other devices and received at the processor is configured to describe how well the real-time video stream of the region of interest can be provided from the second device of the one or more other devices, the second device of the one or more other devices including a camera having a field of view that captures the portion of the object located in the region of interest.

2. The first device of claim 1, wherein the processor is further configured to receive the real-time video stream from the second device of the one or more other devices and to receive a second real-time video stream of the region of interest from a third device of the one or more other devices, the third device including a camera having a field of view that captures the portion of the object in the region of interest.

3. The first device of claim 2, wherein the real-time video stream and the second real-time video stream are combined to generate a single real-time video stream.

4. The first device of claim 1, wherein the score is configured to describe how well the field of view of the camera captures the portion of the object, and wherein the network includes a peer-to-peer network.

5. The first device of claim 1, wherein the network includes a server-based network.

6. The first device of claim 1, wherein the request includes a longitude of the region of interest, a latitude of the region of interest, an altitude of the region of interest, or a combination thereof.

7. The first device of claim 1, wherein the indication includes a binary value configured to indicate at least one of whether the field of view of the camera is potentially a relatively poor view, a less useful view, or a low relevance view, and wherein the first device and the one or more other devices are subscribed to a video sharing application that enables multiple devices to share real-time video streams.

8. The first device of claim 1, wherein the processor is further configured to receive and display the real-time video stream.

9. The first device of claim 1, wherein the request includes an internet protocol address of the first device.

10. The first device of claim 1, wherein the request indicates a viewing angle of the region of interest, a resolution limit of the region of interest, or both.

11. The first device of claim 1, wherein the processor is further configured to receive the indication as a data report from the second device of the one or more other devices, and wherein the processor and the memory are included in a mobile phone, an automobile, or an aircraft.

12. The first device of claim 1, wherein the real-time video stream is sent from the second device of the one or more other devices using a Moving Picture Experts Group (MPEG) format.

13. A method for receiving a real-time video feed of a region of interest, the method comprising:
generating, at a processor of a first device, a request for a real-time video stream of the region of interest, the request indicating a location of the region of interest;
transmitting the request to one or more other devices via a network to query whether another device is situated such that a field of view of the other device captures at least a portion of an object located in the region of interest; and
receiving an indication of a score associated with a second device of the one or more other devices, wherein the indication of the score associated with the second device of the one or more other devices is received at the processor and is configured to describe how well the real-time video stream of the region of interest can be provided from the second device of the one or more other devices, the second device of the one or more other devices including a camera having a field of view that captures the portion of the object located in the region of interest.

14. The method of claim 13, further comprising receiving the real-time video stream from the second device of the one or more other devices and receiving a second real-time video stream of the region of interest from a third device of the one or more other devices, the third device including a camera having a field of view that captures the portion of the object in the region of interest.

15. The method of claim 13, wherein the request includes a longitude of the region of interest, a latitude of the region of interest, an altitude of the region of interest, or a combination thereof.

16. The method of claim 13, further comprising subscribing to a video sharing application prior to generating the request, the video sharing application enabling multiple devices to share real-time video streams, wherein the one or more other devices are subscribed to the video sharing application.

17. The method of claim 13, further comprising receiving and displaying the real-time video stream at the first device.

18. The method of claim 13, wherein the indication of the score associated with the second device of the one or more other devices describes how well the field of view of the camera captures the portion of the object, and wherein the request is transmitted according to a low energy protocol.

19. A non-transitory computer-readable medium comprising instructions for receiving a real-time video feed of a region of interest, the instructions, when executed by a processor within a first device, cause the processor to perform operations comprising:
generating a request for a real-time video stream of the region of interest, the request indicating a location of the region of interest;
transmitting the request to one or more other devices via a network to query whether another device is situated such that a field of view of the other device captures at least a portion of an object located in the region of interest; and
receiving an indication of a score associated with a second device of the one or more other devices, wherein the indication of the score associated with the second device of the one or more other devices is received at the processor and is configured to describe how well the real-time video stream of the region of interest can be provided from the second device of the one or more other devices, the second device of the one or more other devices including a camera having a field of view that captures the portion of the object located in the region of interest.

20. The non-transitory computer-readable medium of claim 19, wherein the request includes a longitude of the region of interest, a latitude of the region of interest, an altitude of the region of interest, or a combination thereof.

21. The non-transitory computer-readable medium of claim 19, wherein the operations further comprise subscribing to a video sharing application prior to generating the request, the video sharing application enabling multiple devices to share real-time video streams, wherein the one or more other devices are subscribed to the video sharing application.

22. The non-transitory computer-readable medium of claim 19, wherein the operations further comprise receiving and displaying the real-time video stream.

23. The non-transitory computer-readable medium of claim 19, wherein the request includes an internet protocol address.

24. The non-transitory computer-readable medium of claim 19, wherein the request indicates a viewing angle of the region of interest.

25. The non-transitory computer-readable medium of claim 19, wherein the request indicates a resolution limit of the region of interest.

26. A first device for receiving a real-time video feed of a region of interest, the first device comprising:

means for transmitting a request for a real-time video stream of the region of interest, the request indicating a location of the region of interest, the means for transmitting configured to transmit the request to one or more other devices via a network to query whether another device is situated such that a field of view of the other device captures at least a portion of an object located in the region of interest; and means for receiving an indication of a score associated with a second device of the one or more other devices, wherein the indication of the score associated with the second device of the one or more other devices and received at the means for receiving is configured to describe how well the real-time video stream of the region of interest can be provided from the second device of the one or more other devices, the second device of the one or more other devices including a camera having a field of view that captures the portion of the object located in the region of interest.

27. The first device of claim 26, wherein the request includes a longitude of the region of interest, a latitude of the region of interest, an altitude of the region of interest, or a combination thereof.

28. The first device of claim 26, wherein the first device is subscribed to a video sharing application prior to transmitting the request, the video sharing application enabling multiple devices to share real-time video streams, and wherein the one or more other devices are subscribed to the video sharing application.

29. The first device of claim 26, further comprising means for receiving the real-time video stream and means for displaying the real-time video stream.

30. The first device of claim 26, wherein the request includes an internet protocol address.

* * * * *